(12) United States Patent
Thiel et al.

(10) Patent No.: US 7,523,019 B2
(45) Date of Patent: *Apr. 21, 2009

(54) METHOD FOR PROCESSING SENSOR DATA

(75) Inventors: Frank Thiel, Asperg (DE); Ralf Maier, Gerlingen (DE); Robert Morgenthal, Dresden (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

This patent is subject to a terminal disclaimer.

(21) Appl. No.: 11/662,296

(22) PCT Filed: Jul. 18, 2005

(86) PCT No.: PCT/EP2005/053447

§ 371 (c)(1),
(2), (4) Date: Sep. 14, 2007

(87) PCT Pub. No.: WO2006/029925

PCT Pub. Date: Mar. 23, 2006

(65) Prior Publication Data

US 2008/0103733 A1    May 1, 2008

(30) Foreign Application Priority Data

Sep. 15, 2004   (DE) ................... 10 2004 044 467

(51) Int. Cl.
*G06F 15/00* (2006.01)

(52) U.S. Cl. .............. 702/189; 702/194; 702/199; 708/209; 708/290; 708/442; 708/445

(58) Field of Classification Search ............... 702/189, 702/194, 199; 708/209, 290, 442, 445
See application file for complete search history.

(56) References Cited

U.S. PATENT DOCUMENTS

2003/0171853 A1* 9/2003 Otterbach et al. .............. 701/1
2008/0195683 A1* 8/2008 Morgenthal ................. 708/209

FOREIGN PATENT DOCUMENTS

DE    197 34 248    2/1999

* cited by examiner

*Primary Examiner*—Tung S Lau
*Assistant Examiner*—Sujoy K Kundu
(74) *Attorney, Agent, or Firm*—Kenyon & Kenyon LLP

(57) ABSTRACT

A method for processing sensor data which are transmitted by at least one asynchronous sensor at a transfer rate into a buffer memory, the sensor data being read from the buffer memory at a predefined sampling rate, and a mean value being computed from a predefined number of read sensor data. The transfer rate to sampling rate ratio is selected in such a way that the number of sensor data averaged within a sampling period is n or (n+1), the mean values of the read sensor data being computed using a fixed synchronized phase shift with respect to the sampling rate, which is determined in averaging (n+1) sensor data, n being a natural number greater than or equal to two.

8 Claims, 3 Drawing Sheets

METHOD FOR PROCESSING SENSOR DATA

BACKGROUND INFORMATION

In systems employing methods that use data from asynchronous sensors, the sensor data values are of different age as a matter of the underlying principle. When considering simulations over sampling variations, the sensor data widen considerably. Therefore the methods, for example, triggering methods for personal protection means, which use the processed sensor data values, must be have an appropriately robust design with respect to these sensor data variations, which makes customer requirements considerably more difficult to meet and increases system costs.

SUMMARY OF THE INVENTION

The method according to the present invention for processing sensor data has the advantage over the related art that the scatter of the sensor data which results due to signal variations in asynchronous sensor sampling is reduced by calculating the mean values of the sensor data that have been read using a fixed synchronized phase shift with respect to the sampling rate. The robustness of a method using the processed data as input values, for example, for triggering personal protection means such as airbags, safety belt tensioners, etc., may thereby be improved. The overall system made up of asynchronous sensors and a control unit using analysis methods is thus improved with respect to signal variations, which occur in reality as a matter of principle. Customer requirements are more easily met due to the reduced signal scatter, and the system costs are reduced. The transfer rate to sampling rate ratio is advantageously selected in such a way that the number of sensor data averaged within a sampling period is n or (n+1), n being a natural number greater than or equal to two. The phase angle of the sensor data transmitted by the at least one asynchronous sensor is estimated when the larger number (n+1) of sensor data occurs within a sampling period and is fixedly predetermined for the subsequent sampling periods having the smaller number of transmitted sensor data. The different "ages" of the sensor data values with respect to the sampling rate and the individual sampling pulses may thus be compensated and the scatter in the event of signal variations may be reduced. The transferred sensor data are quasi-synchronized with the sampling rate.

It is advantageous in particular that, using the method according to the present invention, the mean values computed from (n +1) sensor values are used as starting values for interpolation, preferably linear interpolation, of the subsequent mean values computed from n sensor data. The mean value of the sensor signals computed by interpolation is computed using a constant age with respect to the sampling pulses.

It is furthermore advantageous that, for the interpolation, the number of consecutive averaging operations, each forming the mean of n sensor data read, is ascertained, and the number is reset to zero when an averaging operation forming the mean out of (n+1) sensor data is performed.

The mean value for n sensor data occurring within a sampling period may be determined as a function of their number using equation (1), for example:

$$S_{M(ZS)} = (t_{(ZS)}/Tpas)*(S_{Mnew} - S_{Mold}) + S_{Mold} \quad (1)$$

where $S_M$: mean value
ZS: number of averaging operations using n sensor data values
Tpas: transfer rate For runtime-optimum implementation in a control unit, the factor $(t_{(ZS)}/Tpas)$, which is a function of the number ZS, may be advantageously computed in advance and stored. The factors computed in advance may be stored, for example, in an array using an index corresponding to the particular number ZS. Time $t_{(ZS)}$ represents in general the time interval between the interpolated value and the immediately preceding transmitted data value and may be computed using equation (2), for example:

$$t_{(ZS)} = (Tgs - Tpas*Div(Tgs/Tpas))*ZS \quad (2)$$

where Tgs: sampling rate
Div: integer division without remainder

The general equation (3) for linear interpolation then results from equations (1) and (2):

$$S_{M(ZS)} = ((Tgs/Tpas) - Div(Tgs/Tpas))*ZS*(S_{Mnew} - S_{Mold}) + S_{Mold} \quad (3)$$

DETAILED DESCRIPTION

Figure 2:
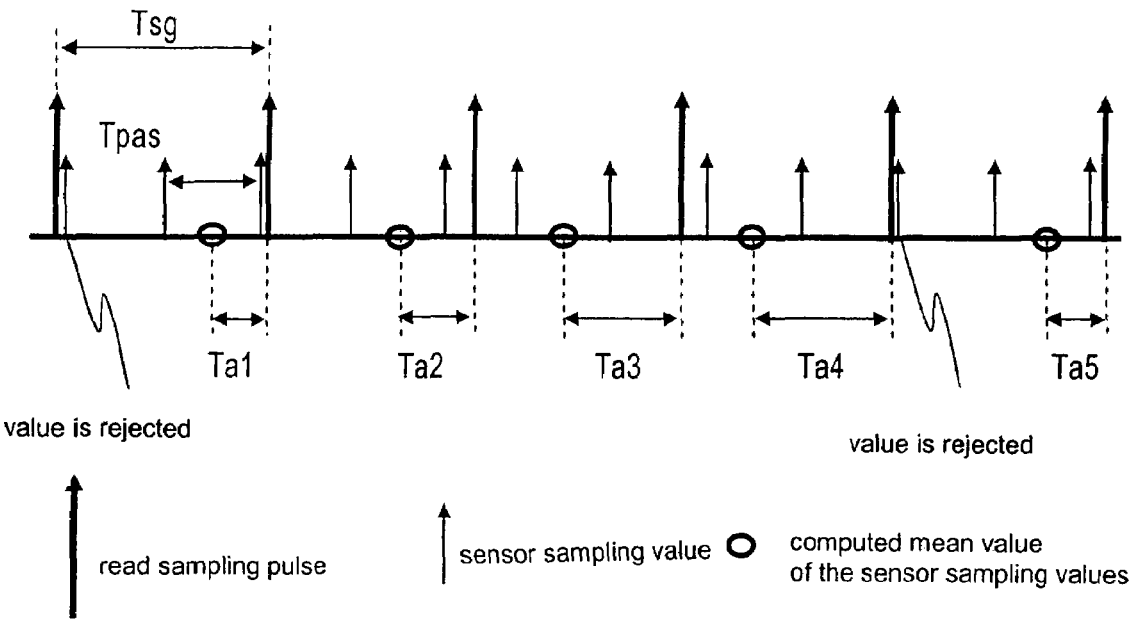
FIG. 2 shows a time sequence diagram for depicting the signals in a conventional processing method.
Figure 4:
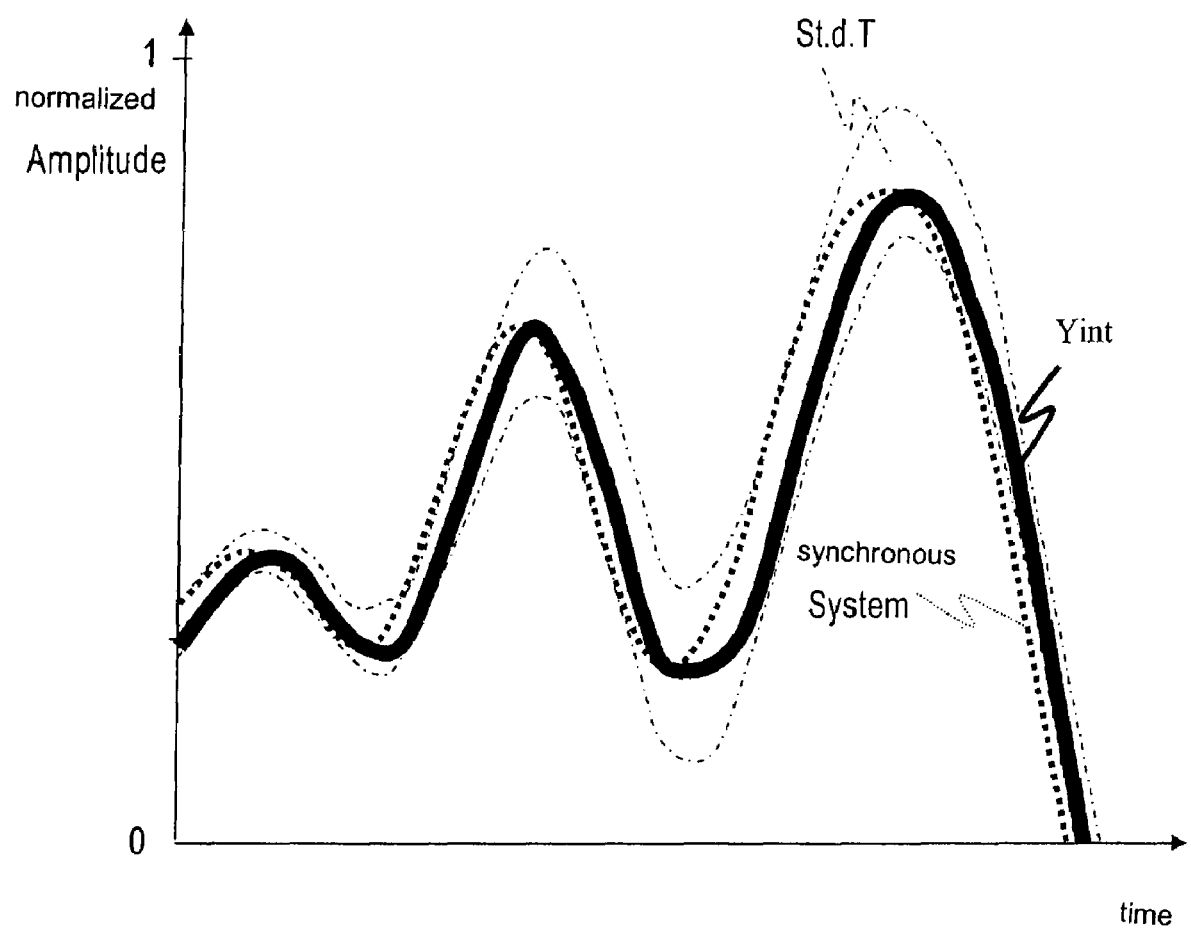
FIG. 4 shows a schematic depiction of the signal scatter for different processing methods.

According to the related art, external peripheral sensors 10 are connected to a control unit 100 via a supply lead. As is apparent from FIG. 2, in a conventional processing method, the at least one asynchronous external sensor 10 transmits the sensor data to control unit 100 at fixed time intervals Tpas of 228 µs, for example. The data is buffered and sampled at a sampling rate Tsg of 512 µs, for example, the mean of the last two sensor data values being computed and used for further processing. As is apparent from FIG. 2, the computed mean values have different phase shifts Ta1 through Ta5 with respect to the sampling pulses, i.e., the sensor values have different "ages." In the example shown, Ta1=142 µs, Ta2=198 µs, Ta3=254 µs, Ta4=310 µs, and Ta5=138 µs. This results, as shown in FIG. 4, in a significant belling out of the sensor data when simulating sampling variations. The age of the sensor values is known via the predefined transfer rate of Tpas=228 µs to an accuracy of ±114 µs. For a theoretical worst-case signal of WCS=A*sin(2*π*$f_{lim}$*114 µs) for a signal amplitude A of 120 LSB, for example, at a sensor frequency $f_{lim}$=400 Hz a signal distortion of ±33.9 LSB results, which approximately corresponds to one-fourth of the maximum signal amplitude of 120 LSB. The amplitude of 120 LSB may represent different physical quantities as a function of the field of application, such as acceleration, temperature, pressure, etc.

Therefore, the mean values of the sensor data read are computed according to the present invention using a fixed synchronized shift Ta with respect to the sampling rate Tsg. This is achieved by selecting the transfer rate Tpas to sampling rate Tsg ratio in such a way that the number of sensor data averaged within a sampling period is n or (n+1), n being a natural number greater than or equal to two. The phase angle of the sensor data transmitted by the at least one asynchronous sensor is estimated when the greater number (n+1) of sensor data values occurs within a sampling period and is fixedly predefined for subsequent sampling periods having the smaller number n of transmitted sensor data values. The different "ages" of the sensor data values with respect to the sampling rate and the individual sampling pulses may be compensated and thus their scatter in the event of signal variations may be reduced.

Figure 1:
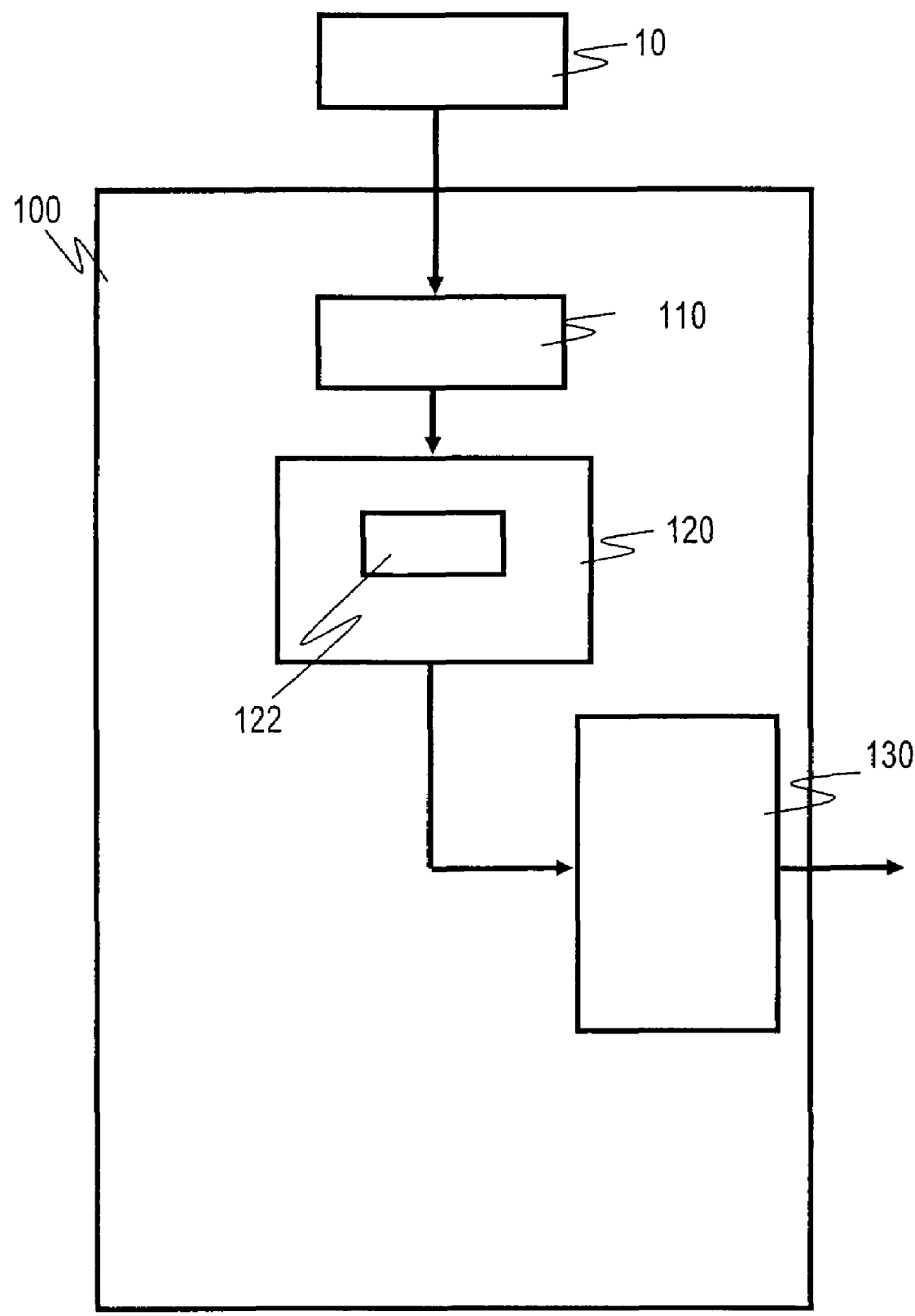
FIG. 1 shows a block diagram of a device for carrying out the method according to the present invention.
Figure 3:
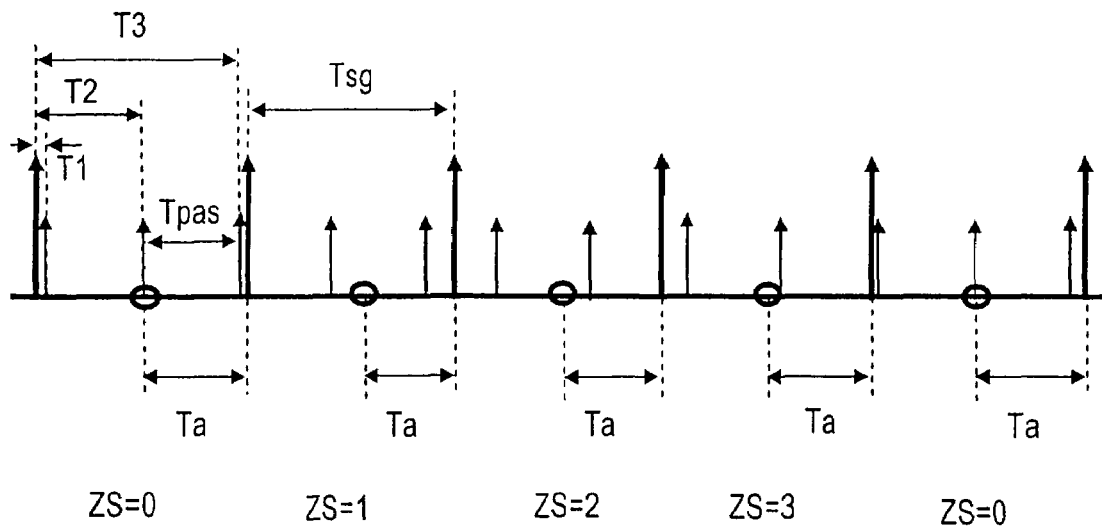
FIG. 3 shows a time sequence diagram for depicting the signals in a processing method according to the present invention.

FIG. 1 shows a block diagram of a device for carrying out the method according to the present invention for processing sensor data, and FIG. 3 shows a time sequence diagram depicting the signals for the processing method according to the present invention. The method according to the present invention is described below with reference to FIGS. 1 and 3.

As is apparent from FIG. 1, the device includes an external sensor system 10, which includes at least one asynchronous sensor and is connected to a control unit 100 via a supply lead. Sensor system 10 transmits sensor data to control unit 100 at fixed time intervals Tpas of 228 µs, for example. The transmitted sensor data is buffered in a buffer memory 110. Control unit 100 includes an analysis and control unit 120, which is designed as a microprocessor, for example, and cyclically reads the data at a sampling rate Tsg of 512 µs, for example, from buffer memory 110, processes the data, and generates input values for a triggering unit 130, for example, which activates a personal protection means such as an airbag, seatbelt tensioner, etc., which are not illustrated. Buffer memory 110 is emptied by the reading of the sensor data. Read cycle Tsg=512 µs is selected for a transfer rate Tpas of 228 µs in such a way that two or three sensor data values are read for averaging within a sampling period. Analysis and control unit 120 includes a counter 122, which counts the averaging operations in which the mean value is formed from two sensor data values transmitted within a sampling period Tsg. If three sensor data values are transmitted within a sampling period Tsg, the corresponding averaging operation resets counter 122 to zero. Count ZS of counter 122 is used for an interpolation, preferably a linear interpolation, of the mean values.

FIG. 3 shows as an example that, due to the transfer rate Tpas to sampling rate Tsg ratio, two or three sensor data values are transmitted within a sampling period. During first sampling period Tsg, three sensor data signals are sampled at a time interval of T1=28 µs, T2=256 µs and T3=484 µs, for example, and count ZS of counter 122 is set to zero. If three sensor data values are read within a sampling period Tsg, the method according to the present invention assumes that they are situated in the middle between the sampling pulses. This assumption may be found to be accurate to ±28 µs for the predefined numerical values of sampling rate Tsg and the transfer rate. The mean value of the sensor signals is computed by a subsequent linear interpolation using a constant phase shift Ta=256 µs with respect to the sampling pulses, i.e., one-half of the sampling signal period Tsg. The signal scatter over a plurality of sampling variations is thus significantly reduced, as is apparent from FIG. 4.

Interpolation for the mean values of the subsequent averaging operations, which take into account only two transmitted sensor data values, is computed, for example, by linear interpolation according to equation (3):

$$S_{M(ZS)} = ((Tgs/Tpas) - Div(Tgs/Tpas)) * ZS * (S_{Mnew} - S_{Mold}) + S_{Mold} \quad (3)$$

Where $S_M$: mean value
ZS: number of averaging operations using n sensor data values
Tpas: transfer rate
Tgs: sampling rate The integer division without remainder Div(Tgs/Tpas) yields, for the numerical examples used in the exemplary embodiment, for Tpas=228 µs and Tgs=512 µs, a value of 2. Instead of the above-described linear interpolation, interpolations of a higher order may also be used.

As is further apparent from FIG. 3, count ZS of counter 122 is incremented by each averaging operation using two sensor data values up to a count of three. Counter 122 is then reset to zero again by the averaging operation using three sensor values. For runtime-optimum implementation, factor $(t_{(ZS)}/Tpas) = ((Tgs/Tpas) - Div(Tgs/Tpas)) * ZS$, dependent on the number of sensor data values, may be advantageously computed in control unit 100 in advance and stored, for example, in an array using an index, which corresponds to the particular count ZS.

The age of the sensor values is known due to the predefined transfer rate of Tpas =256 µs with an accuracy of ±28 µs. For a theoretical worst-case signal of $WCS = A*\sin(2*\pi*f_{lim}*28 \mu s)$ for a signal amplitude A of 120 LSB, for example, at a sensor limit frequency $f_{lim}=400$ Hz a signal distortion of ±8.4 LSB results, which approximately corresponds to one-fourth of the signal distortion of ±33.9 LSB in the conventional method. The signal variance in the method according to the present invention is therefore significantly less than in the conventional method. The amplitude of 120 LSB may represent different physical quantities as a function of the field of application, such as acceleration, temperature, pressure, etc.

The different signal variances are shown again in FIG. 4. FIG. 4 shows, as an example, a crash simulation over approximately 400 sampling periods with a period Tsg=512 µs, which corresponds to approximately 900 transmission periods having a period Tpas=228 µs, by different processing methods using normalized signal amplitudes. The dotted line shows, for comparison, the signal variation of a synchronous system in which no variance occurs as a matter of priniciple. The bolded signal curve shows the signal variance of the method according to the present invention and the dash-dotted curve shows the range of the signal variance of a conventional method.

The method is usable in principle in any system processing sensor data of asynchronous sensors to generate input values, for example, for triggering personal protection means. A sensor system having asynchronous sensors may be designed, for example, as part of an upfront sensor system and/or an environment sensor system and/or a lateral impact sensor system and/or a contact sensor system for pedestrian protection.

What is claimed is:

1. A method for processing sensor data comprising:
transmitting the sensor data by at least one asynchronous sensor at a transfer rate into a buffer memory;
reading the sensor data from the buffer memory at a sampling rate;
computing mean values from a predefined number of read sensor data; and
selecting a ratio of the transfer rate to the sampling rate in such a way that a number of sensor data averaged within a sampling period is n or (n+1), the mean values of the read sensor data being computed using a fixed synchronized phase shift with respect to the sampling rate, which is determined in averaging (n+1) sensor data, and n being a natural number greater than or equal to two.

2. The method according to claim 1, wherein the mean values computed from (n+1) sensor data are used as starting values for an interpolation of subsequent mean values computed from n sensor data.

3. The method according to claim 2, wherein a number of consecutive averaging operations, each forming the mean value of n read sensor data, is determined for the interpolation, the number being reset to zero when the mean value is formed from (n+1) sensor data.

4. The method according to claim 3, wherein the mean value for n sensor data occurring within a sampling period is interpolated as a function of the number by a linear interpolation equation $$S_{M(ZS)}=((Tgs/Tpas)-Div(Tgs/Tpas))*ZS*(S_{Mnew}-S_{Mold})+S_{Mold}.$$

5. The method according to claim 3, wherein factors $(t_{(ZS)}/Tpas)=((Tgs/Tpas)-Div(Tgs/Tpas))*ZS$ which are a function of the number are computed in advance and stored.

6. The method according to claim 5, wherein the factors computed in advance are stored in an array using an index which corresponds to the number.

7. The method according to claim 1, wherein the processed sensor data are used as input values of a triggering operation for a personal protection device.

8. The method according to claim 1, wherein the at least one asynchronous sensor is a part of at least one of an upfront sensor system, an environment sensor system, a lateral impact sensor system, and a contact sensor system for pedestrian protection.

* * * * *